(12) United States Patent
Tojo et al.

(10) Patent No.: US 8,642,172 B2
(45) Date of Patent: Feb. 4, 2014

(54) NANOFIBER SHEET

(75) Inventors: Takehiko Tojo, Tochigi (JP); Masataka Ishikawa, Tochigi (JP); Yoshimi Yamashita, Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/133,104

(22) PCT Filed: Dec. 25, 2009

(86) PCT No.: PCT/JP2009/071559
§ 371 (c)(1),
(2), (4) Date: Jul. 6, 2011

(87) PCT Pub. No.: WO2010/074212
PCT Pub. Date: Jul. 1, 2010

(65) Prior Publication Data
US 2011/0259518 A1   Oct. 27, 2011

(30) Foreign Application Priority Data
Dec. 26, 2008  (JP) ................. 2008-334654

(51) Int. Cl.
*B32B 7/12* (2006.01)
(52) U.S. Cl.
USPC ........ 428/343; 428/350; 428/364; 428/300.7; 428/308.6; 156/308.6
(58) Field of Classification Search
USPC ............ 156/308.6, 314, 324.4; 428/350, 343, 428/364, 292.1, 297.4, 299.7, 300.7, 301.4, 428/327; 442/149
See application file for complete search history.

(56) References Cited

U.S. PATENT DOCUMENTS

| | | |
|---|---|---|
| 2008/0069845 A1 | 3/2008 | Makihara et al. |
| 2008/0149119 A1 | 6/2008 | Marquez et al. |
| 2008/0261043 A1 | 10/2008 | Greiner et al. |
| 2009/0202616 A1 | 8/2009 | Chong et al. |
| 2010/0086777 A1 | 4/2010 | Kim |
| 2010/0254961 A1 | 10/2010 | Nishio et al. |
| 2011/0256397 A1 | 10/2011 | Tojo et al. |
| 2011/0259518 A1 | 10/2011 | Tojo et al. |

FOREIGN PATENT DOCUMENTS

| | | |
|---|---|---|
| CN | 101225284 A | 7/2008 |
| JP | 2003-341 A | 1/2003 |
| JP | 2003-226852 A | 8/2003 |
| JP | 22009253818 A | 8/2003 |

(Continued)

OTHER PUBLICATIONS

International Search Report, dated Feb. 2, 2010, issued in PCT/JP2009/071559.

(Continued)

*Primary Examiner* — Katarzyna Wyrozebski Lee
*Assistant Examiner* — Vishal I Patel
(74) *Attorney, Agent, or Firm* — Birch, Stewart, Kolasch & Birch, LLP (57) ABSTRACT

A nanofiber sheet including a nanofiber layer containing a polymeric nanofiber, a surface of nanofiber sheet being adhesive. The nanofiber preferably contains an adhesive component and a water insoluble polymer. The nanofiber sheet preferably has a water soluble layer containing a nanofiber containing a water soluble adhesive component and a water insoluble layer containing a nanofiber containing a water insoluble polymer laminated to each other. The nanofiber sheet preferably further includes a base layer located on one side of the nanofiber layer and an adhesive layer located on the other side of the nanofiber layer.

9 Claims, 1 Drawing Sheet

(56) References Cited

FOREIGN PATENT DOCUMENTS

| | | | |
|---|---|---|---|
| JP | 2005-290610 A | 10/2005 | |
| JP | 2006-123360 A | 5/2006 | |
| JP | 3944526 B2 | 4/2007 | |
| JP | 2007-197179 A | 8/2007 | |
| JP | 2007-236551 A | 9/2007 | |
| JP | 2007-528944 A | 10/2007 | |
| JP | 2007-303020 A | 11/2007 | |
| JP | 2008-514341 A | 5/2008 | |
| JP | 2008-162098 A | 7/2008 | |
| JP | 2008-163520 A | 7/2008 | |
| JP | 2008-179629 * | 7/2008 | ............... A61K 8/81 |
| JP | 2008-179629 A | 8/2008 | |
| JP | 2008-190093 * | 8/2008 | ............. A41D 31/00 |
| JP | 2008-190093 A | 8/2008 | |
| JP | 2008-531860 A | 8/2008 | |
| JP | 2008-285793 A | 11/2008 | |
| JP | 2009-545307 A | 12/2009 | |
| JP | 2010-167780 A | 8/2010 | |
| JP | 2010-168722 A | 8/2010 | |
| JP | 2010-229560 A | 10/2010 | |
| JP | 2010-248665 A | 11/2010 | |
| JP | 2011-132634 A | 7/2011 | |
| KR | 10-2007-0099926 A | 10/2007 | |
| WO | WO 02/32397 A2 | 4/2002 | |
| WO | WO 2006/036130 A1 | 4/2006 | |
| WO | WO 2008/015573 A2 | 2/2008 | |
| WO | WO 2009/031620 A1 | 3/2009 | |
| WO | WO 2009/120365 A2 | 10/2009 | |
| WO | WO 2009/133059 A2 | 11/2009 | |
| WO | WO 2010/074212 A1 | 7/2010 | |

OTHER PUBLICATIONS

Notice of Rejection for corresponding Japanese Patent Application No. 2009-293480, dated Jan. 8, 2013.
Extended European Search Report dated Jun. 29, 2012, for Application No. 09835008.5.
International Report on Patentability and Written Opionion of the International Searching Authority dated Aug. 25, 2011, for Application No. PCT/JP2009/071559.
International Preliminary Report on Patentability for International Patent Application No. PCT/JP2009/071560, dated Aug. 25, 2011.
International Search Report for International Patent Application No. PCT/JP2009/071560, dated Feb. 2, 2010.
International Search Report for International Patent Application No. PCT/JP2011/064809, dated Sep. 6, 2011.
International Search Report for International Patent Application No. PCT/JP2011/064810, dated Oct. 4, 2011.
International Search Report for International Patent Application No. PCT/JP2011/064811, dated Sep. 6, 2011.
Supplementary European Search Report for European Patent Application No. 09835009.3, dated Jun. 29, 2012.
Written Opinion for International Patent Application No. PCT/JP2011/064809, dated Sep. 6, 2011.
Written Opinion for International Patent Application No. PCT/JP2011/064810, dated Oct. 4, 2011.

\* cited by examiner

NANOFIBER SHEET

TECHNICAL FIELD

The present invention relates to a nanofiber sheet containing a nanofiber.

BACKGROUND ART

Nanofibers are applied to the fields demanding optical characteristics such as high transparency, where the nano-size effect of nanofibers are taken advantage of. For example, transparent fabric may be made of nanofibers with a diameter reduced to or below the wavelength of visible light. By the use of nanofibers the diameter of which is equal to the wavelength of visible light, structural color may be exhibited. Nanofibers also find applications in the fields demanding superabsorbent characteristics or high surface activity, where the super-specific surface area effect of nanofibers is taken advantage of, and in the fields demanding mechanical characteristics such as tensile strength and electrical characteristics such as high conductivity, where the supramolecular arrangement effect of nanofibers is made use of Nanofibers having such characteristics have been used in the form of, for example, not only single fibers but aggregates (i.e., fabrics) or composites.

Embodiments of nanofibers that have been proposed include nanoscale polysaccharide fibers of 500 nm or smaller in diameter, made mainly of polysaccharides, and obtained by electrospinning (see patent literature 1 below). According to the disclosure of patent literature 1, the fibers are useful as a living tissue culture substratum in regenerative medicine or a part of a biomaterial, such as artificial valves, artificial organs, artificial vessels, and wound dressings, aiming at repair, regeneration, or treatment of living tissue deficiency.

A cosmetic sheet comprising a network structure made of a polymer nanofiber and a cosmetic or a cosmetic component held in the network structure has been proposed in patent literature 2 below. Patent literature 2 alleges that the cosmetic sheet has not only improved adhesion or comfort to the user's face, hand, or leg but also improved preservability.

The sheets made of the nanofibers described in patent literatures cited above have low stiffness due to the fineness of the nanofibers and cannot be said to have good handling properties. Furthermore, they are not designed to be transferred easily.

Apart from these techniques, known techniques relating to sheets containing electrospun nanofibers include those of patent literatures 3 and 4 shown below. However, when the sheet obtained in accordance with the techniques disclosed is applied to the surface of an object, for example, human skin, it is liable to fail to maintain the fibrous form or come off due to poor adhesion. To enhance the adhesion, a pressure sensitive adhesive layer might be provided on one side of the sheet, but the adhesive layer is apt to stick to itself because the sheet per se is very thin and make the sheet difficult to handle. Furthermore, when the sheet is applied to the skin, the sheet tends to lift from the skin. To improve the handling properties, a gel may be used as a material of the adhesive layer to increase the stiffness of the sheet, in which case, however, the sheet will have an increased thickness and reduced comfort to the skin when worn.

CITATION LIST

Patent Literature

Patent Literature 1: JP 2005-290610A1
Patent Literature 2: JP 2008-179629A1
Patent Literature 3: WO2002/32397A2
Patent Literature 4: WO2009/031620A1

SUMMARY OF INVENTION

The present invention provides a nanofiber sheet including a nanofiber layer containing a polymeric nanofiber, a surface of the nanofiber sheet being adhesive.

The present invention also provides a method of using the nanofiber sheet by attaching the nanofiber sheet to the surface of an object. The method includes bringing the nanofiber sheet into contact with the surface of the object under the condition that the surface of the object is wetted with a liquid to attach the nanofiber sheet to the surface and releasing an entanglement or bonding of nanofibers of the attached nanofiber sheet at a peripheral portion thereof to reduce the level difference between the nanofiber sheet and the surface of the object.

DESCRIPTION OF EMBODIMENTS

The invention will be described with reference to its preferred embodiments. A first embodiment of the nanofiber sheet of the invention will be described first. The nanofiber according to the first embodiment is made of a nanofiber. The nanofiber layer may contain other components but preferably consists solely of a nanofiber. The nanofiber usually has a thickness of 10 to 3000 nm, preferably 10 to 1000 nm, in terms of circle equivalent diameter. The thickness of nanofibers is measured by, for example, observation using a scanning electron microscope (SEM).

Figure 2:
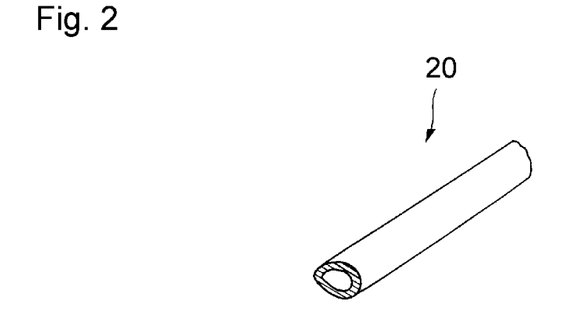

The length of the nanofiber is not critical and may have any length depending on the method of nanofiber manufacturing. The nanofiber may be disposed either unidirectionally or randomly. While the nanofiber is generally solid, a hollow nanofiber as illustrated in FIG. 2 may be used as well. A flattened or ribbon-like hollow nanofiber having a collapsed cross-section is also useful.

The nanofiber sheet may have a thickness decided as appropriate to the intended use. For example, for use as attached to human skin, the thickness of the nanofiber sheet is preferably 50 nm to 1 mm, more preferably 500 nm to 500 µm. The thickness of the nanofiber sheet may be determined using a contact thickness gauge Litematic VL-50A (from Mitutoyo Corp.) with a spherical carbide contact point of 5 mm in radius. A load of 0.01 Pa is applied to the sheet in the thickness measurement. The term "nanofiber sheet thickness" as will be used hereunder denotes the thickness measured by this method.

The nanofiber sheet may have a basis weight decided as appropriate to the intended use. For example, for use as attached to human skin, the basis weight of the nanofiber sheet is preferably 0.01 to 100 g/m$^2$, more preferably 0.1 to 50 g/m$^2$.

The nanofibers making up the nanofiber sheet are bonded to each other at the intersections thereof or entangled with each other, whereby the nanofiber sheet is self-supporting.

Whether the nanofibers are bonded to or entangled with each other depends on the method of manufacture.

One of the characteristics possessed by the nanofiber forming the nanofiber sheet consists in containing an adhesive component and a water-insoluble polymer. The nanofiber containing these two components, the nanofiber sheet containing the nanofiber exhibits good adhesion to and intimate contact with an object. Out of the adhesive component and the water-insoluble polymer, the water insoluble polymer is a material constructing the skeleton of the nanofiber. Therefore, the nanofiber sheet exhibits high adhesiveness in handling without suffering separation between the adhesive component and the water insoluble polymer, the skeleton component.

When the adhesive component is a water soluble polymer, the nanofiber sheet may be applied to the surface of an object together with a water-containing liquid. In this case, upon contact between the nanofiber sheet and water, the water soluble polymer in the nanofiber dissolves in the liquid and develops adhesion to act as a binder, whereby the contact between the sheet and the surface of the object is maintained. Moreover, since the skeleton of the nanofiber is formed of the water insoluble polymer, the nanofiber retains its fibrous form even after the water soluble polymer dissolves.

As used herein, the term "adhesive component" means a component that imparts adhesion and contact properties to a nanofiber sheet when the nanofiber sheet is used as attached to an object. The adhesive component that can be used may be an adhesive water-insoluble polymer and a water-soluble polymer. The adhesive water-insoluble polymer is preferably a polymer having a probe tack (peak value) of 10 to 200 gf measured using a probe tack tester (from Rhesca Corp.) equipped with a cylindrical stainless steel (SUS 304) probe having a diameter of 5.1 mm under conditions of a preload of 50 gf and a press time of 1.0 second. The sample subjected to the probe tack test is a molded piece of the polymer having a circular flat area with a diameter of at least 6 mm. The adhesive water insoluble polymer discussed here will hereinafter be referred to simply as an adhesive polymer so as to avoid confusion with the aforementioned water insoluble polymer.

In the case where an adhesive polymer is used as an adhesive component, the water insoluble polymer to be used in combination therewith is a polymer having no adhesion. The phrase "having no adhesion" as used herein is intended to mean having a probe tack (peal value) of less than 10 gf in the above described probe tack test. In the case where an adhesive polymer is used as an adhesive component, the adhesive polymer may form the skeleton of the nanofiber sheet.

As used herein, the term "water soluble polymer" is intended to denote a polymer that is soluble in water such that at least 50% by weight of the polymer dissolves in water when immersed in 10 or more times its own weight of water for ample time (e.g., 24 hours or longer) at ambient temperature (20° C.±15° C.) and atmospheric pressure.

As used herein, the term "water insoluble polymer" is intended to denote a polymer that is sparingly soluble in water such that at least 80% by weight of the polymer does not dissolve in water when immersed in 10 or more times its own weight of water for ample time (e.g., 24 hours or longer) at ambient temperature (20° C.±15° C.) and atmospheric pressure. The same definition applies to the "adhesive polymer".

When the adhesive component is an adhesive polymer, the proportion of the adhesive component in the nanofiber is preferably 30% to 99%, more preferably 50% to 90%, by weight. In this case, the proportion of the water insoluble polymer used in combination is preferably 1% to 70%, more preferably 10% to 50%, by weight. When the adhesive component is a water soluble polymer, the proportion of the adhesive component in the nanofiber is preferably 1% to 80%, more preferably 3% to 50%, by weight. In this case, the proportion of the water insoluble polymer used in combination is preferably 20% to 99%, more preferably 50% to 97%, by weight. The proportions of the adhesive component and the water soluble polymer falling within the respective ranges recited, the nanofiber sheet exhibits sufficient adhesion and contact when attached to an object while reducing the inconvenience of the nanofibers sticking to each other when the nanofiber sheet is attached to an object. When in using a water soluble polymer as an adhesive component, a combination with a liquid allows for dissolution of the water soluble polymer in the liquid to provide sufficient contact between the nanofiber sheet and the object. In addition to this effect, even when the water soluble polymer dissolves in the liquid, the form of the nanofiber sheet is retained because a sufficient amount of the water insoluble polymer for retaining the nanofiber skeleton is secured.

Examples of the adhesive polymer forming the nanofiber include natural rubber, acrylic resins, such as acrylic ester copolymers, silicone resins, oxazoline-modified silicones, such as poly(N-propanoylethyleneimine) grafted dimethylsiloxane/γ-aminopropylmethylsiloxane copolymer, urethane resins, and copolymers of these resins. They may be used either individually or a combination of two or more thereof. Preferred of these adhesive polymers are acrylic resins and silicone resins in view of their high tackiness and broad applicability.

Examples of the water soluble polymer forming the nanofiber include naturally occurring polymers, such as mucopolysaccharides, such as pullulan, hyaluronic acid, chondroitin sulfate, poly-γ-glutamic acid, modified corn starch, β-glucan, gluco-oligosaccharides, heparin, and keratosulfate; cellulose, pectin, xylan, lignin, glucomannan, galacturonic acid, psyllium seed gum, tamarind seed gum, gum arabic, tragacanth gum, modified corn starch, soybean water-soluble polysaccharides, alginic acid, carrageenan, laminaran, agar (agarose), fucoidan, methyl cellulose, hydroxypropyl cellulose, and hydroxypropylmethyl cellulose; and synthetic polymers, such as partially saponified polyvinyl alcohol (usable in the absence of a crosslinking agent hereinafter described), low-saponified polyvinyl alcohol, polyvinylpyrrolidone (PVP), polyethylene oxide, and sodium polyacrylate. These water soluble polymers may be used either individually or in combination of two or more thereof. Preferred of them are pullulan and synthetic polymers such as partially saponified polyvinyl alcohol, low-saponified polyvinyl alcohol, polyvinylpyrrolidone, and polyethylene oxide in view of ease of conversion to nanofibers.

Examples of water insoluble polymer forming the nanofiber include polyvinyl alcohol (for example, completely saponified polyvinyl alcohol that is insolubilizable after formation of nanofiber or partially saponified polyvinyl alcohol that is crosslinkable in the presence of a crosslinking agent hereinafter described after formation of nanofiber), oxazoline-modified silicones, such as poly(N-propanoylethyleneimine) grafted dimethylsiloxane/γ-aminopropylmethylsiloxane copolymer, zein (main component of maize protein), polyesters, polylactic acid (PLA), acrylic resins, such as polyacrylonitrile resins and polymethacrylic acid resins, polystyrene resins, polyvinyl butyral resins, polyethylene terephthalate resins, polybutylene terephthalate resins, polyurethane resins, polyamide resins, polyimide resins, and polyamide-imide resins. The water insoluble polymers may be used either individually or in combination of two or more thereof. Of the water insoluble polymers described, preferred are completely saponified polyvinyl alcohol insolubilizable after formation into nanofiber, partially saponified polyvinyl alcohol crosslinkable after formation into nanofiber in the presence of a crosslinking agent, oxazoline-modified silicones, such as poly(N-propanoylethyleneimine) grafted dimethylsiloxane/γ-aminopropylmethylsiloxane copolymer, water soluble polyesters, polyvinyl butyral resins, and zein because they are easy to admix in the form of a solution with an adhesive component and insolubilizable after drying.

The nanofiber may consist solely of the above described water soluble polymer and water insoluble polymer or may contain other components in addition to these polymers. Such other components include a crosslinking agent, a pigment, a filler, a perfume, a surfactant, an antistatic agent, and a foaming agent. A crosslinking agent is used to crosslink and insolubilize, for example, the partially saponified polyvinyl alcohol described above. A pigment is used to color the nanofiber. Each of these other components is preferably used in an amount of 0.01% to 70% by weight in the nanofiber.

The nanofiber sheet of the invention may be used alone or in a multilayer structure in which it is laminated with other sheet, such as a base sheet that supports the nanofiber sheet before use to improve the handling properties of the nanofiber sheet. The combined use of the base sheet makes the nanofiber sheet which has low stiffness more manageable when attached to an object such as human skin.

To improve the handling properties of the nanofiber sheet, it is preferred for the base sheet to have a Taber stiffness of 0.01 to 0.4 mNm, more preferably 0.01 to 0.2 mNm. Taber stiffness is determined in accordance with JIS P8125, "Determination of Stiffness". The term "Taber stiffness" in the following description denotes the value measured by that method.

Besides the Taber stiffness, the thickness of the base sheet is also influential on the handling properties of the nanofiber sheet. From this viewpoint, the thickness of the base sheet is preferably 5 to 500 μm, more preferably 10 to 300 μm, while varying with the material of the base sheet. The thickness of the base sheet may be measured in the same manner as for the thickness of the nanofiber sheet.

It is preferred for the base sheet to be air-permeable so that the nanofiber sheet may be transferred to an object. The base sheet preferably has a Gurley air permeance of 30 sec/100 ml or less, more preferably 20 sec/100 ml or less. The Gurley air permeance of the base sheet is measured in accordance with JIS P8117.

The base sheet is preferably provided directly on the nanofiber sheet. In this case, it is preferred that the base sheet be releasably laminated to the nanofiber sheet. Such a structure is advantageous in that the base sheet may be stripped off the nanofiber sheet after the nanofiber sheet is attached to, for example, human skin to leave the nanofiber sheet on the human skin.

The base sheet may be a film of synthetic resins, such as polyolefin resins and polyester resins. In the case where such a film is releasably laminated to the nanofiber sheet, it is preferred that the side of the film facing the nanofiber sheet be previously subjected to a release treatment, such as application of a silicone resin or a corona discharge treatment, to have increased releasability.

The base sheet may be a mesh sheet, in which case the base sheet is able to be releasably laminated to the nanofiber sheet with no particular need to perform a release treatment, such as application of a silicone resin. In using a mesh sheet, the mesh size is preferably 20 to 200 mesh/inch, more preferably 50 to 150 mesh/inch. The wire diameter of the mesh is preferably 10 to 200 μm, more preferably 30 to 150 μm. The mesh sheet may be of any of the materials of the film described above.

Paper and nonwoven fabric, which are air-permeable materials, are also useful as a base sheet. In this case, too, the base sheet is able to be releasably laminated to the nanofiber sheet with no particular need to perform a release treatment, such as application of a silicone resin. Furthermore, when the nanofiber sheet is transferred to an object via a liquid, paper or nonwoven fabric would absorb excess of water. Examples of the material making paper or nonwoven fabric include natural fibers, such as plant fibers (e.g., cotton, kapok, wood pulp, non-wood pulp, peanut protein fiber, corn protein fiber, soybean protein fibers, mannan fiber, rubber fiber, hemp, Manila fiber, sisal fiber, New Zealand flax, Luo Buma, coconut, rush, and straw), animal fibers (e.g., wool, goat hair, mohair, cashmere, alpaca, angora, camel, vicuna, silk, down, small feather, alginate fiber, chitin fiber, and casein fiber), and mineral fibers (e.g., asbestos); synthetic fibers, such as semisynthetic fibers (e.g., acetate, triacetate, acetate oxide, promix, chlorinated rubber, and hydrochlorinated rubber), metal fibers, carbon fiber, and glass fiber. Also useful are single fibers of a polyolefin, e.g., high density polyethylene, medium density polyethylene, low density polyethylene, or polypropylene, polyester, polyvinylidene chloride, starch, polyvinyl alcohol, or polyvinyl acetate, or a copolymer or modified polymer thereof and conjugate fibers having any of these resins as a core.

Figure 1:
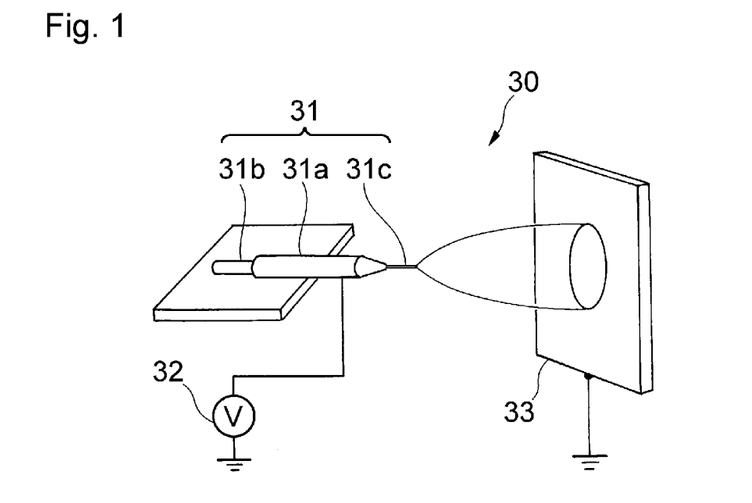
FIG. 1 is a schematic view of an apparatus for carrying out electrospinning
FIG. 2 schematically shows a structure of a nanofiber.

The nanofiber sheet of the invention is suitably produced by, for example, depositing a nanofiber on the surface of a smooth substrate by electrospinning. FIG. 1 illustrates an apparatus 30 for carrying out electrospinning. An apparatus 30 for achieving electrospinning includes a syringe 31, a high voltage supply 32, and a conductive collector 33. The syringe 31 has a cylinder 31a, a piston 31b, and a capillary 31c. The capillary 31c has an inner diameter of about 10 to 1000 μm. The cylinder 31a is filled with a solution of a polymer, the raw material of nanofibers. The solvent of the polymer solution is water or an organic solvent or a mixed solvent of water and a water-compatible organic solvent, which depends on the kind of the polymer. The high voltage supply 32 is, for example, a 10 to 30 kV direct voltage source. The positive pole of the high voltage supply 32 is electrically connected to the polymer solution in the syringe 31, with the negative pole grounded. The conductive collector 33 is, e.g., a metal plate that is grounded. The distance between the tip of the capillary 31c of the syringe 31 and the conductive collector 33 is set at, e.g., about 30 to 300 mm. The apparatus 30 shown in FIG. 1 may be operated in the atmosphere. The operative environment is not particularly limited and may be, for example, 20° to 40° C. and 10 to 50% RH.

With a voltage applied between the syringe 31 and the conductive collector 33, the piston 31b in the syringe 31 is slowly pressed inward to eject the polymer solution from the tip of the capillary 31c. As the jet travels toward the conductive collector 33, the solvent evaporates, and the polymer (solute) solidifies while being stretched due to the difference of electrical potential, thereby forming a nanofiber. By disposing an unshown sheet as a base layer on the surface of the conductive collector 33, the nanofiber is accumulated on the surface of the base layer. From the nature of the production process, the thus formed nanofiber is a continuous filament of infinite length. The hollow nanofiber as illustrated in FIG. 2 is obtained by, for example, using a double barreled capillary as the capillary 31c and feeding incompatible solutions in the core and the sheath.

The polymer solution discussed above may be, for instance, an aqueous solution containing a water soluble polymer and another water soluble polymer that is water-insolubilizable by a treatment after fiber formation. It is advantageous to use polyvinyl alcohol as a water soluble polymer that is water-insolubilizable by a treatment after fiber formation; for polyvinyl alcohol is water soluble and becomes water insoluble on crystallization by heat drying or crosslinking in the presence of a crosslinking agent. After the formation of a nanofiber sheet by electrospinning, the sheet may be heated to provide a nanofiber sheet having a nanofiber containing a water soluble resin and a water insoluble resin of polyvinyl alcohol. The heating is preferably carried out at a temperature of 60° to 300° C. for a period of 1 to 200 minutes.

In using a polymer that is water insolubilized on drying, it is preferred to use a stock polymer solution to be electrospun which is prepared by dissolving the polymer and a water soluble polymer in a solvent. The solvent may be chosen from various kinds of liquids, including water and aqueous liquids such as mixed solvents containing water and a water soluble organic solvent.

The polymer solution may be a solution containing a water soluble polymer, a water insoluble polymer soluble in a water-compatible organic solvent, and a mixed solvent of water and the organic solvent. Examples of such organic solvent/water insoluble polymer combinations include a combination of an oxazoline-modified silicone and ethanol or methanol and a combination of zein and ethanol or acetone.

The polymer solution may also be a solution of a water soluble polymer soluble in both water and an organic solvent and a water insoluble polymer in an organic solvent. Such a water soluble polymer/water insoluble polymer combination is exemplified by a combination of hydroxypropyl cellulose and polyvinyl butyral.

In the production of a multilayered sheet including the nanofiber sheet, a sheet constituting one of the layers of the multilayer structure is disposed on the surface of the substrate on which an electrospun nanofiber is accumulated. For example, in making a multilayered sheet composed of the nanofiber sheet and the aforementioned base sheet, a nanofiber is accumulated on the base sheet by electrospinning.

The nanofiber sheet thus obtained is used as attached to, for example, human skin, skin and teeth of non-human mammals, and the surface of parts of plants, such as branches and foliage. In these applications, when the adhesive component is a water soluble polymer, it is preferred to bring the nanofiber sheet into contact with the surface of an object under the condition that the surface of the object is wetted with a liquid, whereby the nanofiber sheet comes into good contact with the surface of the object by the action of surface tension. Then, the water soluble polymer dissolves in the liquid, and the dissolved water soluble polymer serves as a binder to keep the contact between the nanofiber sheet and the surface of the object. When wetting, instead of an object, the nanofiber sheet with an aqueous solution, inconveniences, such as shrinkage of the nanofiber sheet or wrinkling and curling of the nanofiber sheet due to the surface tension of the liquid, can occur, tending to result in a failure of successful attachment to the object.

The surface of an object may be wetted by, for example, applying or spraying a liquid of various kinds to the surface. The liquid to be applied (or sprayed) is an aqueous liquid or an oily liquid. It is preferred for the liquid, whether aqueous or oily, to have as high as possible a surface tension.

When the adhesive component is a water soluble polymer, the liquid may be an oily liquid but is preferably an aqueous liquid. An aqueous liquid may be a substance containing water and having a viscosity of about 5000 mPa·s or less. Such a liquid is exemplified by water, an aqueous solution, or an aqueous dispersion. Emulsions, including O/W emulsions and W/O emulsions, and liquids thickened with various thickeners are also useful. More specifically, in the case when the nanofiber sheet is attached to the human skin, examples of the liquid used to wet the surface of the object (skin) include skin lotion and beauty cream.

With regard to the degree of wetting the surface of the object or the surface of the nanofiber sheet by applying or spraying a liquid, it suffices to apply a minimum amount of a liquid required for the liquid to sufficiently exhibit a surface tension. When in using an aqueous liquid, it suffices to apply a minimum amount of the aqueous liquid required for the liquid to sufficiently exhibit a surface tension and, in addition, to allow the water soluble polymer to dissolve therein. While the amount of a liquid to be applied varies with the size of the nanofiber sheet, the nanofiber sheet 10 measuring, for example, 3 cm by 3 cm will easily be attached to the surface of an object in the presence of about 0.01 ml of a liquid on the surface of the object. When in using an aqueous liquid for wetting and a water soluble polymer as an adhesive component, the water soluble polymer in the nanofiber dissolves in the liquid.

In the case where the nanofiber sheet is laminated with the base sheet to make a laminate sheet, the nanofiber sheet side of the laminate sheet is brought into contact with the surface of an object. Then, the base sheet may be stripped off the nanofiber sheet to accomplish transfer of the nanofiber sheet to the surface of the object. According to this method, the nanofiber sheet, which cannot be said to have good handling properties because of its low stiffness, is attachable with good manageability to the surface of an object.

When the adhesive component is an adhesive water insoluble polymer, attaching the nanofiber sheet to an object does not always need wetting the surface of the object with a liquid unlike with the case of using a water soluble polymer because the nanofiber sheet per se has high adhesion. This does not mean that the surface of the object should not be wetted with a liquid when in using an adhesive water insoluble polymer as an adhesive component.

In the case of using a water soluble polymer as an adhesive component, the water soluble polymer of the nanofiber in the nanofiber sheet attached to the surface of an object dissolves in the liquid so that an entanglement or bonding of the nanofibers at the intersections thereof becomes weak. In this state, the entanglement or bonding of the nanofibers may be released or weakened at the peripheral portion of the nanofiber sheet to reduce a level difference between the nanofiber sheet and the surface of the object. It follows that the boundary between the nanofiber sheet and the object is blurred to improve visual integration of the nanofiber sheet with the object. Releasing or weakening the entanglement or bonding at the peripheral portion of the nanofiber sheet may be achieved by, for example, imposing a shearing force to the peripheral portion of the nanofiber sheet having been attached to the surface of an object and wetted with the liquid. The shearing force may be applied by, for example, lightly rubbing or stroking the peripheral portion of the nanofiber sheet with a finger, a spatula, and so on.

As described, the nanofiber sheet of the first embodiment is made up of an adhesive component and a water insoluble polymer, and the water insoluble polymer forms the skeleton of the nanofiber. Therefore, the nanofiber sheet exhibits high adhesive performance without suffering separation between the adhesive component and the water insoluble polymer, the structural component, in handling the nanofiber sheet.

The nanofiber sheet of the invention incorporating a second embodiment will then be described. Unless otherwise stated, the description of the first embodiment applies to the second embodiment as appropriate. The nanofiber sheet of the present embodiment has a multilayer structure. The nanofiber sheet of the present embodiment may have, for example, a dual layer structure having a water soluble layer and a water insoluble layer. The water soluble layer is formed of a water soluble nanofiber containing a water soluble polymer. Upon contact of the water soluble layer with a liquid, the water soluble polymer constituting the water soluble layer dissolves to lose its fibrous form and develop intimate contact with an object. On the other hand, the water insoluble layer is formed of water insoluble nanofiber containing a water insoluble polymer. The nanofiber forming the water insoluble layer maintains its fibrous form even in contact with a liquid. It is preferred for the water soluble layer not to contain a water insoluble nanofiber containing a water insoluble polymer. It is preferred for the water insoluble layer not to contain a water soluble nanofiber containing a water soluble polymer. When the nanofiber sheet having the two layers described is applied to the surface of an object together with a liquid, the water soluble polymer of the water soluble nanofiber in the water soluble layer dissolves in the liquid, and the dissolved water soluble polymer acts as a binder to retain the contact between the sheet and the surface of the object. After the water soluble polymer dissolves, the nanofiber sheet retains the sheet form because the water insoluble layer remains.

The proportion of the water soluble layer in the multilayered nanofiber sheet is preferably 0.1% to 80% by weight, more preferably 1% to 50% by weight. The proportion of the water insoluble layer is preferably 20% to 99.9% by weight, more preferably 50% to 99% by weight. The recited ranges of the proportions of the two layers are advantageous in that the multilayered nanofiber sheet exhibits better contact with an object. The basis weight of the water soluble layer is preferably 0.01 to 50 $g/m^2$, more preferably 0.1 to 30 $g/m^2$, and that of the water insoluble layer is preferably 0.05 to 100 $g/m^2$, more preferably 0.1 to 50 $g/m^2$.

The water soluble polymer forming the water soluble nanofiber may be chosen from those described as for the first embodiment with no particular limitation. Similarly, the water insoluble polymer forming the water insoluble nanofiber may be any of those described as for the first embodiment.

The water soluble nanofiber may consist solely of the water soluble polymer or may contain other components in addition to the water soluble polymer. Such other components include a pigment, a filler, a perfume, a surfactant, a tackifier, an antistatic agent, and a foaming agent. A pigment is used to color the nanofiber. Similarly, the water insoluble nanofiber may consist solely of the water insoluble polymer or may contain other components in addition to the water insoluble polymer. Such other components include a pigment as described above and, in addition, a crosslinking agent. A crosslinking agent is used to crosslink and insolubilize, for example, the partially saponified polyvinyl alcohol described above. A preferred content of each of these other components in whichever nanofiber it is present is 0.01% to 70% by weight in the nanofiber. The water insoluble nanofiber may contain a small amount of a water soluble polymer as long as the amount of the water insoluble nanofiber is enough to retain its fibrous form after the water soluble polymer dissolves in water on contact with water.

The thicknesses of the water soluble layer and the water insoluble layer in the multilayered nanofiber sheet are decided as appropriate to the intended use of the nanofiber sheet. For example, for use as attached to human skin, the thickness of the water soluble layer is preferably 0.01 to 500 µm, more preferably 0.1 to 100 µm, and that of the water insoluble layer is preferably 0.1 to 1000 µm, more preferably 0.5 to 500 µm. The overall thickness of the multilayered nanofiber sheet is preferably 50 nm to 1 mm, more preferably 500 nm to 500 µm.

The multilayered nanofiber sheet of the present embodiment may be used either alone or in a further multilayered structure in which it is laminated with other sheet. Examples of the other sheet that may be used in combination with the multilayered nanofiber sheet include a base sheet that supports the multilayered nanofiber sheet before use to improve the handling properties of the nanofiber sheet. The combined use of the base sheet makes the multilayered nanofiber sheet which has low stiffness more manageable when attached to an object such as human skin.

Any of the base sheets useful in the first embodiment can be used in the present embodiment with no particular limitation. The base sheet is preferably provided directly on the multilayered nanofiber sheet. In this case, it is preferred that the base sheet be laminated to the water insoluble layer side of the multilayered nanofiber sheet. It is also preferred that the base sheet be releasably laminated to the multilayered nanofiber sheet. Such a structure is advantageous in that the base sheet may be stripped off the multilayered nanofiber sheet after the multilayered nanofiber sheet is attached to, for example, human skin to leave the multilayered nanofiber sheet on the human skin.

The multilayered nanofiber sheet of the present embodiment is suitably produced by, for example, depositing nanofibers on the surface of a smooth substrate by electrospinning similarly to the first embodiment. In this case, formation of a water insoluble layer of a nanofiber containing a water insoluble polymer on the surface of the substrate is followed by the formation of a water soluble layer of a nanofiber containing a water soluble polymer on the water insoluble layer.

The apparatus 30 described with reference to the first embodiment may be used to carry out electrospinning. The apparatus 30 having the structure shown may be used to make both the water insoluble layer and the water soluble layer.

The apparatus 30 of FIG. 1 is used as follows. The cylinder 31a is filled with a solution of polymer that is a raw material of a water insoluble nanofiber. An unshown sheet is disposed as a base layer on the surface of the conductive collector 33, and a water insoluble nanofiber is accumulated on the surface of the base layer.

The solution of a polymer may be, for example, an aqueous solution containing a water soluble polymer that is rendered water insoluble by a treatment after fiber formation. Completely saponified polyvinyl alcohol is used advantageously as a water soluble polymer that is water-insolubilized by a treatment after fiber formation. Completely saponified polyvinyl alcohol is water soluble and becomes water insoluble on heating. Accordingly, the formation of a water insoluble layer by electrospinning or the formation of the whole nanofiber sheet is followed by heating to provide a water insoluble soluble layer having the nanofiber containing the water insoluble resin obtained from the completely saponified polyvinyl alcohol. The heating is preferably carried out at a temperature of 60° to 300° C. for a period of 1 to 200 minutes.

The solution of the polymer may also be an organic solvent solution of a water insoluble polymer soluble in an organic solvent. Examples of such organic solvent/water insoluble polymer combination include a combination of polylactic acid and chloroform, a combination of an oxazoline-modified silicone and ethanol, and a combination of zein, polyvinyl butyral, etc. and ethanol.

After the water insoluble layer is formed, the electrospinning operation is once suspended. Electrospinning is resumed using an aqueous solution of a water soluble polymer. The second electrospinning operation is performed on the surface of the deposited water insoluble nanofiber forming the water insoluble layer. The second electrospinning operation may be conducted under the same conditions as in the first electrospinning operation.

The thus obtained multilayered nanofiber sheet of the present embodiment is used as attached to the surface of various objects in the same manner as in the first embodiment. In applications, the water soluble layer side of the multilayered nanofiber sheet is brought into contact with the surface of an object under the condition that the surface of the water soluble layer side of the multilayered nanofiber sheet or the surface of the object is wetted with an aqueous liquid, whereby the nanofiber sheet comes into good contact with the surface of the object by the action of surface tension. Then, the water soluble polymer of the water soluble layer dissolves in the aqueous liquid, and the dissolved water soluble polymer serves as a binder to keep the contact between the multilayered nanofiber sheet and the surface of the object. Any of the aqueous liquids described with respect to the first embodiment may be used here with no particular limitation. The amount of the aqueous liquid to be used may be decided in the same manner as in the first embodiment.

After the nanofiber sheet is attached to an object, it is preferred to release an entanglement or bonding of the nanofibers of the nanofiber sheet at a peripheral portion of the nanofiber sheet in the same way as in the first embodiment so as to reduce a level difference between the nanofiber sheet and the surface of the object.

Figure 3:
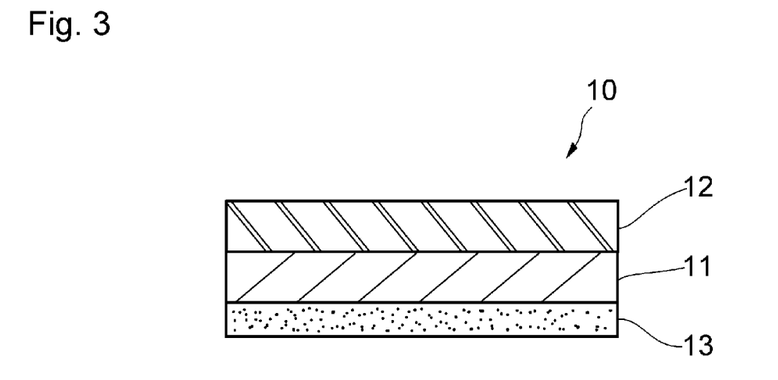
FIG. 3 is a schematic cross-section showing a structure of a nanofiber sheet incorporating the third embodiment of the invention.

The nanofiber sheet of the invention incorporating a third embodiment will be described. Unless otherwise stated, the description of the first and second embodiments applies to the third embodiment as appropriate. FIG. 3 is a schematic cross-sectional view showing the structure of a nanofiber sheet according to the present embodiment. As shown in the figure, the nanofiber sheet 10 of the present embodiment is a three-layered laminate. Specifically, the nanofiber sheet 10 includes a nanofiber layer 11, a base layer 12 provided on one side of the nanofiber layer 11, and an adhesive layer 13 provided on the other side. It is noted that FIG. 3 is merely illustrative and does not represent the actual thickness ratio of the layers.

The description given with reference to the nanofiber layer of the first and the second embodiments appropriately applies to the nanofiber layer 11. The nanofiber contained in the nanofiber layer 11 is made from a polymer, which may be either naturally occurring or synthetic and either water soluble or water insoluble. Examples of the naturally occurring polymers include mucopolysaccharides, such as chitin, chitosan, hyaluronic acid, chondroitin sulfate, heparin, and keratosulfate; cellulose, pectin, xylan, lignin, glucomannan, galacturonic acid, psyllium seed gum, tamarind seed gum, gum arabic, tragacanth gum, modified corn starch, soybean water-soluble polysaccharides, alginic acid, carrageenan, laminaran, agar (agarose), and fucoidan.

Examples of the synthetic polymers include polyvinyl alcohol, polystyrene, polycarbonate, polyacrylic acid, polymethyl acrylate, polyvinyl chloride, polyethylene terephthalate, polyamide 66, polyamide 46, polyurethane, polylactic acid, polycaprolactone, polyethylene glycol, polylactic glycolic acid, polyvinyl acetate, and polyethylene oxide.

The thickness range described as for the nanofiber sheet of the first and the second embodiments equally applies to the nanofiber layer 11 in the nanofiber sheet 10 of the present embodiment.

The base layer 12 on one side of the nanofiber layer 11 is provided to improve the handling properties of the nanofiber sheet 10. Specifically, the base layer 12 is provided to increase the stiffness of the nanofiber sheet 10. Used in combination with the base layer 12, the nanofiber layer 11 having low stiffness is attachable with good manageability to an object, such as human skin.

To make the nanofiber sheet 10 moderately stiff, it is preferred for the base layer 12 to have a Taber stiffness of 0.01 to 0.4 mNm, more preferably 0.01 to 0.2 mNm.

Besides the Taber stiffness, the thickness of the base layer 12 is also influential on the handling properties of the nanofiber sheet 10. From this viewpoint, the thickness of the base layer 12 is preferably 5 to 500 µm, more preferably 10 to 300 µm, while varying with the material of the base layer 12. The thickness of the base layer 12 may be measured in the same manner as for the nanofiber sheet.

The base layer 12 is provided directly on the nanofiber layer 11. It is preferred that the base layer 12 be releasably laminated to the nanofiber layer 11, in which case the base layer 12 may be stripped off the nanofiber layer 11 after the nanofiber layer 11 is attached to, for example, human skin to leave only the nanofiber layer 11 (exactly the nanofiber layer 11 plus the adhesive layer 13) on the human skin.

The base layer 12 may be a film of synthetic resins, such as polyolefin resins and polyester resins. In the case where the base layer 12 is releasably laminated to the nanofiber layer 11, it is preferred that the side of the film facing the nanofiber layer 11 be previously subjected to a release treatment, such as application of a silicone resin or a corona discharge treatment, to have increased releasability. The thickness and Taber stiffness of the film preferably fall within the respective ranges recited above.

The base layer 12 may be an air-permeable sheet. In this case, the base layer 12 is able to be releasably laminated to the nanofiber layer 11 with no particular need to perform the above-described release treatment, such as application of a silicone resin. The air-permeable base layer 12 preferably has an air resistance (Gurley) of 30 sec/100 ml or less, more preferably 20 sec/100 ml or less, even more preferably 0.1 to 20 sec/100 ml, as determined by the method specified in JIS P8117. Examples of air-permeable sheets are mesh sheets, fibrous sheets (e.g., woven, nonwoven, or knitted fabric and paper), and laminates thereof. Fibers that make the fibrous sheets may be fibers formed of fiber-forming synthetic resins or cellulosic natural fibers, such as cotton and pulp. The fibrous sheet preferably has a basis weight of 0.1 to 100 g/m$^2$, more preferably 0.5 to 50 g/m$^2$, in view of strength and handling properties. In using a mesh sheet as an air-permeable sheet, the mesh size is preferably 20 to 200 mesh/inch, more preferably 50 to 150 mesh/inch, as long as the air resistance is within the above described range. The wire diameter of the mesh is preferably 10 to 200 µm, more preferably 30 to 150 µm. The mesh sheet may be of any of the materials of the film described above.

The adhesive layer 13 provided on the opposite side of the nanofiber layer 11 is used to help the nanofiber layer 11 to be attached to an object, such as human skin. Examples of the adhesive used to make the adhesive layer 13 for that purpose include pressure-sensitive adhesives, such as oxazoline-modified silicones, acrylic resins, olefin resins, and synthetic rubbers.

The adhesive layer 13 may be provided continuously over the entire area of the other side of the nanofiber layer 11 but is preferably provided in a requisite minimum amount so that the nanofiber layer 11 may show its full advantages. Therefore, the adhesive layer 13 is preferably formed discretely on the other side of the nanofiber layer 11. The manners for discretely forming the adhesive layer 13 include (i) disposing an adhesive in dots on the nanofiber layer 11 and (ii) depositing an adhesive in the form of nanofiber on the nanofiber layer 11.

Whichever of the manners (i) and (ii) is employed to form the adhesive layer 13, the thickness of the adhesive layer 13 is preferably 10 nm to 100 µm, more preferably 50 nm to 50 µm. The thickness of the adhesive layer 13 may be determined using a contact thickness gauge Litematic VL-50A (from Mitutoyo Corp.).

With regard to the thickness relation between the adhesive layer 13 and the nanofiber layer 11, it is preferred that the nanofiber layer 11 be thicker than the adhesive layer 13. This is because the closer to the skin the nanofiber layer is, the more efficiently the active ingredient possessed by the nanofiber is delivered to the skin. From this viewpoint, the thickness of the nanofiber layer 11 is preferably 2 to 1000 times, more preferably 10 to 500 times, the thickness of the adhesive layer 13.

The nanofiber sheet 10 of the present embodiment is suitably produced according to, for example, the following procedures. (i) A nanofiber is deposited by electrospinning on one side of a base layer 12 to form a nanofiber layer 11. (ii) An adhesive layer 13 is formed on the surface of the nanofiber layer 11 by a prescribed means. More specifically, a nanofiber layer 11 is formed on one side of a base layer 12 using the apparatus illustrated in FIG. 1 and described with reference to the first and the second embodiments.

An adhesive layer is then formed on the thus formed nanofiber layer 11. When the adhesive layer 13 is of an adhesive of nanofiber form, the adhesive layer 13 is formed by the same procedure mentioned above. When the adhesive layer 13 is of an adhesive applied in dots, an adhesive may be sprayed to form the adhesive layer 13, or the above described operation is carried out using a thin solution of an adhesive to deposit particles of the adhesive. An adhesive may be extruded from a nozzle and applied in lines, in a grid pattern, in a thin film form, or otherwise. The adhesive layer 13 is preferably applied in the form of nanofiber as long as a water soluble resin or a like adhesive is used, and the adhesive is capable of uniform application in a thin film form, in which case there is provided an increased surface area, and the adhesive layer 13 easily dissolves.

In that way, a desired nanofiber sheet 10 having a three-layer structure is obtained. The nanofiber sheet 10 may be used by applying on the side of the adhesive layer 13 to an object, e.g., human skin and then removing the base layer 12 off the nanofiber sheet 11. After the nanofiber sheet 10 is attached to the object, it is preferred that an entanglement or bonding of the nanofibers of the nanofiber sheet 10 at a peripheral portion of the nanofiber sheet 10 be released to reduce a level difference between the nanofiber sheet 10 and the surface of the object similarly in the first and second embodiments.

While the invention has been described with reference to its preferred embodiments, it should be understood that the invention is not limited thereto. For example, while in the foregoing embodiments, the electrospinning technique is adopted to make nanofibers, the method for making nanofibers is not limited thereto.

While, according to the electrospinning technique shown in FIG. 1, the nanofiber formed is collected on the conductive collector 33 of plate shape, a conductive rotating drum may be used instead of the plate-shaped collector, in which case the nanofiber is deposited on the peripheral surface of the rotating drum.

A layer of a pressure-sensitive adhesive may be formed on the nanofiber sheet in place of, or in addition to, the base sheet laminated to the nanofiber sheet, whereby the contact between the nanofiber sheet and the surface of an object is further improved.

While the multilayered nanofiber sheet of the second embodiment has a dual layer structure composed of a water soluble layer and a water insoluble layer, the multilayered nanofiber sheet may have a three-layer structure composed of a water soluble layer, a water insoluble layer, and a water soluble layer or may have more than three layers in which a water soluble layer and a water insoluble layer alternate with each other.

EXAMPLES

The invention will now be illustrated in greater detail by way of Examples. It should be noted, however, that the invention is not construed as being limited thereto. Unless otherwise noted, all the percents are by weight.

Example 1-1

Pullulan (from Hayashibara Co.) and completely saponified polyvinyl alcohol (PVA 117, from Kuraray; degree of saponification: ≥99%) were used as a water soluble polymer and a water insoluble polymer, respectively. These polymers were dissolved in water to make a stock solution for electrospinning (hereinafter "ES solution") the composition of which is shown in Table 1 below. The solution was knitted into a nanofiber using the apparatus of FIG. 1 to form a nanofiber layer on the surface of a polyethylene terephthalate mesh (bolting cloth, Tetron #120, from Tokyo Screen) as a base sheet. The conditions of nanofiber production were as follows.
Applied voltage: 27 kV
Capillary-collector distance: 185 mm
Rate of ejection of solution: 1 ml/hr
Environment: 28° C., 36% RH The resulting nanofiber sheet was heat treated at 200° C. for 30 minutes to crystallize and thereby water-insolubilize the completely saponified polyvinyl alcohol. The resulting nanofiber sheet had a thickness of 8.4 µm. The thickness of the nanofiber was between 100 and 500 nm.

Examples 1-2 to 1-5

Nanofiber sheets were obtained in the same manner as in Example 1-1, except for changing the composition of the ES solution as shown in Table 1. The resulting nanofiber sheets had a thickness between 8 to 14 µm. The thickness of the nanofiber was between 100 and 500 nm.

Example 1-6

A nanofiber sheet was obtained in the same manner as in Example 1-1, except for using as a water soluble polymer partially saponified polyvinyl alcohol (PVA 217, from Kuraray; degree of saponification: 86.5% to 89%). The resulting nanofiber sheet had a thickness of 13.7 µm. The thickness of the nanofiber was between 100 and 500 nm.

Example 1-7

Pullulan (from Hayashibara Co.) and partially saponified polyvinyl alcohol (PVA 217, from Kuraray; degree of saponification: 86.5% to 89%) were used as a water soluble polymer and a water insoluble polymer, respectively. These polymers and, as a crosslinking agent for the partially saponified polyvinyl alcohol, Orgatics TC-310 (from Matsumoto Trading) were dissolved in water to make an ES solution the composition of which is shown in Table 1. A nanofiber sheet was formed using the ES solution in the same manner as in Example 1-1. The conditions of nanofiber production were as follows. The resulting nanofiber sheet was heat treated at 105° C. for 120 minutes to crosslink the partially saponified polyvinyl alcohol. The resulting nanofiber sheet had a thickness of 10.2 μm. The thickness of the nanofiber was between 100 and 500 nm
Applied voltage: 25 kV
Capillary-collector distance: 185 mm
Rate of ejection of solution: 1.0 ml/hr
Environment: 30.0° C., 26% RH

Example 1-8

Pullulan (from Hayashibara Co.) and a water soluble polyester (Pluscoat Z-3310, from Goo Chemical) were used as a water soluble polymer and a water insoluble polymer, respectively. These polymers were dissolved in water to make an ES solution the composition of which is shown in Table 1. A nanofiber sheet was formed using the ES solution in the same manner as in Example 1-1. The conditions of nanofiber production were as follows. The resulting nanofiber sheet was not subjected to heat treatment. The nanofiber sheet had a thickness of 14.4 μm. The thickness of the nanofiber was between 100 and 500 nm.
Applied voltage: 25 kV
Capillary-collector distance: 185 mm
Rate of ejection of solution: 1.0 ml/hr
Environment: 30.5° C., 21% RH

Example 1-9

Hydroxypropyl cellulose (Celny L, from Nippon Soda) and polyvinyl butyral (S-LEC BM-1, from Sekisui Chemical) were used as a water soluble polymer and a water insoluble polymer, respectively. These polymers were dissolved in ethanol to make an ES solution the composition of which is shown in Table 1. A nanofiber sheet was formed using the ES solution in the same manner as in Example 1-1. The conditions of nanofiber production were as follows. The resulting nanofiber sheet was not subjected to heat treatment. The nanofiber sheet had a thickness of 25 μm. The thickness of the nanofiber was between 100 and 1000 nm.
Applied voltage: 25 kV
Capillary-collector distance: 185 mm
Rate of ejection of solution: 1.0 ml/hr
Environment: 25.5° C., 31% RH

Example 1-10

An oxazoline-modified silicone and polyvinyl butyral (S-LEC BM-1, from Sekisui Chemical) were used as an adhesive polymer and a water insoluble polymer, respectively. These polymers were dissolved in ethanol to make an ES solution the composition of which is shown in Table 1. A nanofiber sheet was formed using the ES solution in the same manner as in Example 1-1. The conditions of nanofiber production were as follows. The resulting nanofiber sheet was not subjected to heat treatment. The nanofiber sheet had a thickness of 40 μm. The thickness of the nanofiber was between 100 and 1000 nm.
Applied voltage: 25 kV
Capillary-collector distance: 185 mm
Rate of ejection of solution: 1.0 ml/hr
Environment: 33° C., 20% RH

Comparative Example 1-1

In Comparative Example 1-1 a water soluble polymer was not used. That is, a nanofiber sheet was obtained in the same manner as in Example 1-1, except for using an ES solution having the composition shown in Table 2 below. The nanofiber sheet had a thickness of 7.4 μm. The thickness of the nanofiber was between 100 and 500 nm.

Comparative Example 1-2

In Comparative Example 1-2 a water soluble polymer was not used. That is, a nanofiber sheet was obtained in the same manner as in Example 1-7, except for using an ES solution having the composition shown in Table 2. The nanofiber sheet had a thickness of 10.7 μm. The thickness of the nanofiber was between 100 and 500 nm.

Comparative Example 1-3

In this Comparative Example a water insoluble polymer was not used. That is, a nanofiber sheet was obtained in the same manner as in Example 1-1, except for using an ES solution having the composition shown in Table 2. The nanofiber sheet had a thickness of 5 μm. The thickness of the nanofiber was between 100 and 500 nm.

Comparative Example 1-4

In this Comparative Example a water insoluble polymer was not used. That is, a nanofiber sheet was obtained in the same manner as in Example 1-7, except for using an ES solution having the composition shown in Table 2. The nanofiber sheet had a thickness of 11.5 μm. The thickness of the nanofiber was between 100 and 500 nm.

[Evaluation]

Each of the nanofiber sheets obtained in Examples and Comparative Examples was evaluated for contact with skin and fibrous form retention in accordance with the methods described below. The results obtained are shown in Tables 1 and 2.

[Contact with Skin]

Subjects were three males and females aged 25-40 years. The inner forearm of each subject was cleaned with a neutral surfactant and, after wiping off water drops with waste cloth, left to stand for a sufficient time at 20° C. and 50% RH to stabilize the skin surface. Ion exchanged water weighing about 0.05 g was sprayed evenly onto a 70 mm diameter region of the skin. A 20 mm by 20 mm piece cut out of each of the nanofiber sheets of Examples 1-1 through 1-9 and Comparative Examples 1-1 through 1-4 was attached thereto and allowed to stand until water dried. A 20 mm by 20 mm piece cut out of the nanofiber sheet of Example 1-10 was attached to the skin with no spray of ion exchanged water applied. After an elapse of about 60 minutes, the contact of the nanofiber sheet with the skin was evaluated according to the following criteria.

A: The sheet is in contact with the skin even at the four corners.
B: The sheet is in contact with the skin but, in part, easily comes off the skin.
C: The sheet comes off the skin for the most part.

[Fibrous Form Retention]

The surface of glass was cleaned with a neutral surfactant and wiped with waste cloth to remove water drops. After an elapse of a sufficient time at 20° C. and 50% RH, ion exchanged water weighing about 0.05 g was sprayed evenly onto a 70 mm diameter region of the glass. A 50 mm by 50 mm piece cut out of each of the nanofiber sheets of Examples 1-1 through 1-9 and Comparative Examples 1-1 through 1-4 was attached thereto and allowed to stand until water dried. A 50 mm by 50 mm piece cut out of the nanofiber sheet of Example 1-10 was attached to the glass with no spray of ion exchanged water applied, and ion exchanged water weighing about 0.05 g was sprayed evenly on the nanofiber sheet over a 70 mm diameter area. The wetted nanofiber sheet was allowed to stand until dry. In that state, when the nanofiber dissolves and loses its fibrous form, or when the dissolved water soluble polymer fills the spaces between nanofibers to cause a loss of the fibrous form, the glass surface becomes transparent. Accordingly, the retention of the fibrous form of the nanofiber is evaluated by the degree of the transparency. The criteria of evaluation were as follows.

A: The nanofiber sheet becomes opaque on drying.
B: The nanofiber sheet becomes semitransparent on drying.
C: The nanofiber sheet remains transparent after drying.

TABLE 1

|  |  | Example 1-1 |  | Example 1-2 |  | Example 1-3 |  | Example 1-4 |  | Example 1-5 |  |
|---|---|---|---|---|---|---|---|---|---|---|---|
|  |  | Component | Solid Basis Ratio (%) | Component | Solid Basis Ratio (%) | Component | Solid Basis Ratio (%) | Component | Solid Basis Ratio (%) | Component | Solid Basis Ratio (%) |
| Composition of ES Solution | Adhesive Component | pullulan | 10 | pullulan | 5 | pullulan | 30 | pullulan | 50 | pullulan | 70 |
|  | Water Insoluble Polymer | completely saponified PVA | 90 | completely saponified PVA | 95 | completely saponified PVA | 70 | completely saponified PVA | 50 | completely saponified PVA | 30 |
|  | Others | — | — | — | — | — | — | — | — | — | — |
|  | Solvent | ion exchanged water |  | ion exchanged water |  | ion exchanged water |  | ion exchanged water |  | ion exchanged water |  |
|  | Solids Concentration (%) | 10.5 |  | 10.3 |  | 11.5 |  | 12.5 |  | 13.5 |  |
|  | Insolubilization Treatment | 200° C., 30 mins |  | 200° C., 30 mins |  | 200° C., 30 mins |  | 200° C., 30 mins |  | 200° C., 30 mins |  |
| Evaluation Results | Thickness (μm) | 8.4 |  | 8.4 |  | 9.4 |  | 9.7 |  | 13.1 |  |
|  | Basis Weight (m²/g) | 2.1 |  | 2.1 |  | 2.2 |  | 2.5 |  | 3.6 |  |
|  | Contact with Skin | A |  | B |  | A |  | A |  | A |  |
|  | Fibrous Form Retention | A |  | A |  | A |  | A |  | B |  |

|  |  | Example 1-6 |  | Example 1-7 |  | Example 1-8 |  | Example 1-9 |  | Example 1-10 |  |
|---|---|---|---|---|---|---|---|---|---|---|---|
|  |  | Component | Solid Basis Ratio (%) | Component | Solid Basis Ratio (%) | Component | Solid Basis Ratio (%) | Component | Solid Basis Ratio (%) | Component | Solid Basis Ratio (%) |
| Composition of ES Solution | Adhesive Component | partially saponified PVA | 9 | pullulan | 9 | pullulan | 30 | HPC[*2] | 20 | OS[*4] | 70 |
|  | Water Insoluble Polymer | completely saponified PVA | 81 | partially saponified PVA | 81 | PEs[*1] | 70 | PVB[*3] | 80 | PVB[*3] | 30 |
|  | Others | — | — | crosslinking agent | 9 | — | — | — | — | — | — |
|  | Solvent | ion exchanged water |  | ion exchanged water |  | ion exchanged water |  | ethanol |  | ethanol |  |
|  | Solids Concentration (%) | 10.0 |  | 10.0 |  | 28.0 |  | 10.0 |  | 10.0 |  |
|  | Insolubilization Treatment | 200° C., 30 mins |  | 100° C., 30 mins |  | — |  | — |  | — |  |
| Evaluation Results | Thickness (μm) | 13.7 |  | 10.2 |  | 14.4 |  | 25.0 |  | 40.0 |  |
|  | Basis Weight (m²/g) | 2.5 |  | 2.3 |  | 6.5 |  | 5.0 |  | 8.0 |  |
|  | Contact with Skin | A |  | A |  | A |  | A |  | B |  |
|  | Fibrous Form Retention | A |  | A |  | B |  | A |  | A |  |

[*1]Water soluble polyester
[*2]Hydroxypropyl cellulose
[*3]Polyvinyl butyral
[*4]Oxazoline-modified silicone

TABLE 2

| | | Compara. Example 1-1 | | Compara. Example 1-2 | | Compara. Example 1-3 | | Compara. Example 1-4 | |
|---|---|---|---|---|---|---|---|---|---|
| | | Component | Solid Basis Ratio (%) | Component | Solid Basis Ratio (%) | Component | Solid Basis Ratio (%) | Component | Solid Basis Ratio (%) |
| Composition of ES Solution | Adhesive Component | — | — | — | — | pullulan | 100 | partially saponified PVA | 100 |
| | Water Insoluble Polymer | completely saponified PVA | 100 | partially saponified PVA | 90 | — | — | — | — |
| | Others | — | — | crosslinking agent | 10 | — | — | — | — |
| | Solvent | ion exchanged water | | ion exchanged water | | ion exchanged water | | ion exchanged water | |
| | Solids Concentration (%) | 10.0 | | 10.0 | | 10.0 | | 10.0 | |
| | Insolubilization Treatment | 200° C., 30 mins | | 100° C., 30 mins | | 200° C., 30 mins | | 100° C., 30 mins | |
| Evaluation Results | Thickness (μm) | 7.4 | | 10.7 | | 5.0 | | 11.5 | |
| | Basis Weight (m²/g) | 1.9 | | 2.4 | | 2.0 | | 2.4 | |
| | Contact with Skin | C | | C | | A | | A | |
| | Fibrous Form Retention | A | | A | | C | | C | |

As is apparent from the results in Table 1, all the nanofiber sheets obtained in Examples exhibit good contact with the skin and, seeing that they retain opaqueness after drying, are considered to retain the form of a fiber aggregate. In contrast, the results in Table 2 reveal that the nanofiber sheets of Comparative Examples 1-1 and 1-2, which are made up of nanofibers containing no water soluble polymer, retain the form of a fiber aggregate as can be seen from the opaqueness when attached to the glass but exhibit poor contact with the skin. Conversely, although the nanofiber sheets of Comparative Examples 1-3 and 1-4, which are formed of nanofibers containing no water insoluble polymer, exhibit good contact with the skin, they turned transparent when attached to the glass, indicating a loss of the form of a fiber aggregate.

Example 2-1

Completely saponified polyvinyl alcohol (PVA 117, from Kuraray; degree of saponification: ≥99%) was used as a water insoluble polymer precursor. The completely saponified polyvinyl alcohol was mixed with water and dissolved by heating to make an ES solution having the composition shown in Table 3 below. The solution was electrospun using the apparatus of FIG. 1 onto the surface of a polyethylene terephthalate mesh (bolting cloth, Tetron #120, from Tokyo Screen; Taber stiffness: 0.13 mNm; wire diameter: 63 μm; mesh size: 120 mesh/inch) to form a layer of the completely saponified polyvinyl alcohol on the mesh. In this stage, this layer was not water-insoluble. The layer was stripped off the polyethylene terephthalate mesh, and its thickness was measured using Litematic VL-50A (from Mitutoyo Corp.) and found to be 15 μm. The conditions of nanofiber production were as follows.
Applied voltage: 28 kV
Capillary-collector distance: 185 mm
Rate of ejection of solution: 1.0 ml/hr
Environment: 25° C., 38% RH
Pullulan (from Hayashibara Co.) was used as a water soluble polymer. The pullulan was dissolved in water to prepare an ES solution having the composition shown in Table 3. The ES solution was electrospun under the same conditions as described above to form a water soluble layer on the completely saponified polyvinyl alcohol layer. The water soluble layers were stripped off the polyethylene terephthalate mesh, and their total thickness was measured using Litematic VL-50A (from Mitutoyo Corp.). Subtracting the thickness of the completely saponified polyvinyl alcohol layer from the total thickness gave the thickness of the water soluble pullulan layer, which was found to be 0.7 μm.

The resulting multilayered nanofiber sheet was heat treated at 200° C. for 30 minutes to water-insolubilize the completely saponified polyvinyl alcohol in the completely saponified polyvinyl alcohol layer to provide a purposed nanofiber sheet. The thickness of the nanofiber of the water soluble layer and that of the water insoluble layer were both found to be between 100 nm and 500 nm under SEM observation.

Example 2-2

A nanofiber sheet having the thickness shown in Table 3 was obtained in the same manner as in Example 2-1, except for changing the basis weights of the water soluble layer and the water insoluble layer as shown in Table 3. The thickness of the nanofiber of the water soluble layer and that of the water insoluble layer were both found to be between 100 nm and 500 nm under SEM observation.

Example 2-3

An ES solution having the composition shown in Table 3 was prepared using partially saponified polyvinyl alcohol (PVA 217, from Kuraray; degree of saponification: 86.5% to 89%) as a water insoluble polymer precursor and Orgatics TC-310 (from Matsumoto Trading) as a crosslinking agent for the partially saponified polyvinyl alcohol. A nanofiber sheet having the thickness shown in Table 3 was obtained in the same manner as in Example 2-1, except for using the resulting ES solution, changing the basis weights of the water soluble layer and the water insoluble layer as shown in Table 3, and changing the heat treating conditions for crosslinking the partially saponified polyvinyl alcohol with the crosslinking agent as shown in Table 3. The thickness of the nanofiber of the water soluble layer and that of the water insoluble layer were both found to be between 100 nm and 500 nm under SEM observation.

Example 2-4

An ES solution having the composition shown in Table 3 was prepared using partially saponified polyvinyl alcohol (PVA 217, from Kuraray; degree of saponification: 86.5% to 89%) as a water insoluble polymer. A nanofiber sheet having the thickness shown in Table 3 was obtained in the same manner as in Example 2-1, except for using the resulting ES solution and changing the basis weights of the water soluble layer and the water insoluble layer as shown in Table 3. The thickness of the nanofiber of the water soluble layer and that of the water insoluble layer were both found to be between 100 nm and 500 nm under SEM observation.

Example 2-5

Polylactic acid (PLA) was used as a water insoluble polymer. PLA was dissolved in a mixed solvent of 81% chloroform and 19% dimethylformamide to prepare an ES solution having the composition shown in Table 3. The solution was electrospun using the apparatus of FIG. 1 onto the surface of a polyethylene terephthalate mesh (bolting cloth, Tetron #120, from Tokyo Screen; Taber stiffness: 0.13 mNm; wire diameter: 63 μm; mesh size: 120 mesh/inch) to form a water insoluble layer on the mesh. The conditions of nanofiber production were as follows. The thickness of the water insoluble layer was 7.3 μm.
Applied voltage: 18 kV
Capillary-collector distance: 170 mm
Rate of ejection of solution: 1.0 ml/hr
Environment: 25° C., 38% RH Pullulan (from Hayashibara Co.) was used as a water soluble polymer. The pullulan was dissolved in water to prepare an ES solution having the composition shown in Table 3. A water soluble layer was formed on the water insoluble layer using the resulting ES solution under the same conditions as used above. The resulting water soluble layer had a thickness of 0.7 μm.

A multilayered nanofiber sheet was thus obtained. The thickness of the nanofiber of the water soluble layer and that of the water insoluble layer were both found to be between 100 nm and 1000 nm under SEM observation. Unlike Example 2-1, the present example did not involve heat treatment.

Comparative Example 2-1

In Comparative Example 2-1 a water soluble layer was not provided. That is, a nanofiber sheet was obtained in the same manner as in Example 2-1, except for using an ES solution having the composition shown in Table 4 below. The water insoluble layer had the basis weight shown in Table 4. The nanofiber sheet had a thickness of 15 μm.

Comparative Example 2-2

In Comparative Example 2-2 a water soluble layer was not provided. That is, a nanofiber sheet was obtained in the same manner as in Example 2-3, except for using an ES solution having the composition shown in Table 4. The water insoluble layer had the basis weight shown in Table 4. The nanofiber sheet had a thickness of 11 μm.

Comparative Example 2-3

In Comparative Example 2-3 a water soluble layer was not provided. That is, a nanofiber sheet was obtained in the same manner as in Example 2-5, except for using an ES solution having the composition shown in Table 4 below. The water insoluble layer had the basis weight shown in Table 4. The nanofiber sheet had a thickness of 7.3 μm.

Comparative Example 2-4

In Comparative Example 2-4 a water insoluble layer was not provided. That is, a nanofiber sheet was obtained in the same manner as in Example 2-1, except that an ES solution having the composition shown in Table 4 was used and that the heat treatment was not carried out. The nanofiber sheet had a thickness of 0.7 μm.

Comparative Example 2-5

In Comparative Example 2-4 a water insoluble layer was not provided. That is, a nanofiber sheet was obtained in the same manner as in Example 2-4, except that an ES solution having the composition shown in Table 4 was used, the basis weight of the water soluble layer was changed as in Table 4, and the heat treatment was not carried out. The nanofiber sheet had a thickness of 13.4 μm.

[Evaluation]

Each of the nanofiber sheets obtained in Examples and Comparative Examples was evaluated for contact with skin and fibrous form retention in the same manner as stated above, except that the cut piece of the nanofiber sheet attached to glass measured 20 mm by 20 mm. The results obtained are shown in Tables 3 and 4.

TABLE 3

| | | Example 2-1 | | Example 2-2 | | Example 2-3 | | Example 2-4 | | Example 2-5 | |
|---|---|---|---|---|---|---|---|---|---|---|---|
| Water Insoluble Layer | Polymer | PVA 117 | 100% | PVA 117 | 100% | PVA 217 | 90% | PVA 117 | 100% | PLA | 100% |
| | Crosslinking Agent | — | — | — | — | TC 310 | 10% | — | — | — | — |
| | ES Solution Concentration (%) | 10 | | 10 | | 10 | | 10 | | 10 | |
| | Thickness (μm) | 15 | | 7.4 | | 10.7 | | 7.4 | | 7.3 | |
| | Basis Weight (g/m²) | 4 | | 1.9 | | 2.4 | | 1.9 | | 1.8 | |
| Water Soluble Layer | Polymer | pullulan | 100% | pullulan | 100% | pullulan | 100% | PVA 217 | 100% | pullulan | 100% |
| | ES Solution Concentration (%) | 15 | | 15 | | 15 | | 10 | | 15 | |
| | Thickness (μm) | 0.7 | | 1.4 | | 1.4 | | 8.5 | | 0.7 | |
| | Basis Weight (g/m²) | 0.5 | | 0.9 | | 0.9 | | 2.2 | | 0.5 | |

TABLE 3-continued

|  | Example 2-1 | | Example 2-2 | | Example 2-3 | | Example 2-4 | | Example 2-5 |
|---|---|---|---|---|---|---|---|---|---|
| Heat Treatment | 200° C. | 30 mins | 200° C. | 30 mins | 100° C. | 30 mins | 200° C. | 30 mins | — |
| Contact with Skin | B | | A | | A | | A | | A |
| Fibrous Form Retention | A | | A | | A | | A | | A |

TABLE 4

| | | Comp. Example 2-1 | | Comp. Example 2-2 | | Comp. Example 2-3 | | Comp. Example 2-4 | | Comp. Example 2-5 | |
|---|---|---|---|---|---|---|---|---|---|---|---|
| Water Insoluble Layer | Polymer | PVA 117 | 100% | PVA 27 | 90% | PLA | 100% | — | | — | |
| | Crosslinking Agent | — | | TC 310 | 10% | — | | — | | — | |
| | ES Solution Concentration (%) | 10 | | 10 | | 10 | | — | | — | |
| | Thickness (μm) | 15 | | 11 | | 7.3 | | — | | — | |
| | Basis Weight (g/m²) | 4 | | 2.4 | | 1.8 | | — | | — | |
| Water Soluble Layer | Polymer | — | | — | | — | | pullulan | 100% | PVA 217 | 100% |
| | ES Solution Concentration (%) | — | | — | | — | | 15 | | 10 | |
| | Thickness (μm) | — | | — | | — | | 0.7 | | 13.4 | |
| | Basis Weight (g/m²) | — | | — | | — | | 0.5 | | 3.1 | |
| Heat Treatment | | 200° C. | 30 mins | 100° C. | 30 mins | — | | — | | — | |
| Contact with Skin | | C | | C | | C | | A | | A | |
| Fibrous Form Retention | | A | | A | | A | | C | | C | |

As is apparent from the results in Tables 3 and 4, all the nanofiber sheets of Examples exhibit good contact with the skin and good retention of the fibrous form. In contrast, the results reveal that the nanofiber sheets of Comparative Examples 2-1, 2-2, and 2-3, which do not have a water soluble layer, retain the fibrous form but exhibit poor contact with the skin. Although the nanofiber sheets of Comparative Examples 2-4 and 2-5, which, on the other hand, do not have a water insoluble layer, exhibit good contact with the skin, they lose the fibrous form on contact with water.

Example 3-1

Polylactic acid resin (L101, from Toray) was dissolved in a 80:20 (by weight) mixture of chloroform and dimethylformamide to make a 9% solution. The solution was electrospun using the apparatus of FIG. 1 to form a nanofiber layer on the surface of a film as a base layer. The conditions of nanofiber production were as follows.
Applied voltage: 17 kV
Capillary-collector distance: 150 mm
Rate of ejection of solution: 1 ml/hr
Environment: 25° C., 30% RH
The film as a base layer was a polyethylene terephthalate film (thickness: 25 μm; Taber stiffness: 0.08 mNm) having one side thereof treated with silicone for easy release. The nanofiber layer was formed on the release treated side. The formed nanofiber layer had a thickness of 30 μm, and the thickness of the nanofiber was 300 nm.

An adhesive layer was formed on the surface of the nanofiber layer by electrospinning using the apparatus shown in FIG. 1. A 20% solution of an oxazoline-modified silicone in methanol was used as a polymer solution. The electrospinning conditions for the formation of the adhesive layer were as follows. The thickness of the resulting adhesive layer was 5 μm.

Applied voltage: 17 kV
Capillary-collector distance: 150 mm
Rate of ejection of solution: 1 ml/hr
Environment: 25° C., 30% RH
Thus, a nanofiber sheet having the structure illustrated in FIG. 3 was obtained. The nanofiber sheet was attached on its adhesive layer side to the skin of a subject's upper arm, and the base layer was then removed. As a result, the nanofiber layer was neatly transferred to the skin.

Example 3-2

A nanofiber sheet having the structure of FIG. 3 was obtained in the same manner as in Example 3-1, except for replacing the polyethylene terephthalate film with a polyethylene terephthalate mesh sheet (mesh size: 120 mesh/inch; wire diameter: 63 μm). The mesh sheet had not been subjected to any release treatment. The mesh sheet had an air resistance of 0.1 sec/100 ml or less and a Taber stiffness of 0.13 mNm. The operation of transfer was carried out in the same manner as in Example 3-1. As a result, the nanofiber layer was transferred to the human skin more successfully than in Example 3-1.

Example 3-3

A nanofiber sheet having the structure shown in FIG. 3 was obtained in the same manner as in Example 3-1, except for replacing the polyethylene terephthalate film with a spun-bonded nonwoven fabric (basis weight: 40 g/m²; thickness: 0.28 mm). The nonwoven fabric was of sheath/core conjugate fiber composed of polyethylene terephthalate as a core and polyethylene as a sheath. The nonwoven fabric had an air resistance of 0.1 sec/100 ml and a Taber stiffness of 0.06 mNm. The operation of transfer was carried out using the resulting nanofiber sheet in the same manner as in Example 3-1. As a result, the nanofiber layer was transferred to the human skin more successfully than in Example 3-1.

Example 3-4

A nanofiber sheet having the structure of FIG. 3 was obtained in the same manner as in Example 3-1, except for using paper for plain paper copiers (basis weight: 78 g/m$^2$; thickness: 0.09 mm) in place of the polyethylene terephthalate film. The paper had an air resistance of 21 sec/100 ml and a Taber stiffness of 0.12 mNm. The resulting nanofiber sheet was transferred in the same manner as in Example 3-1. As a result, the nanofiber layer was transferred to the human skin more successfully than in Example 3-1.

INDUSTRIAL APPLICABILITY

As described, the invention allows for easy and steady contact of a nanofiber sheet with an object.

The invention claimed is:

1. A nanofiber sheet comprising:
a nanofiber layer containing a polymeric nanofiber, a surface of the nanofiber sheet being adhesive; and
a water soluble layer containing a nanofiber containing a water soluble adhesive component and a water insoluble layer containing a nanofiber containing a water insoluble polymer laminated to each other;
wherein the nanofiber sheet has a multilayer structure.

2. The nanofiber sheet according to claim 1, wherein the water soluble adhesive component of the water soluble layer dissolves in the presence of water to develop intimate contact with an object.

3. The nanofiber sheet according to claim 1, comprising 0.1% to 80% by weight of the water soluble layer and 20% to 99.9% by weight of the water insoluble layer.

4. The nanofiber sheet according to claim 1, further comprising a base layer located on one side of the nanofiber layer and an adhesive layer located on the other side of the nanofiber layer.

5. The nanofiber sheet according to claim 4, wherein the base layer is releasably laminated to the nanofiber layer.

6. The nanofiber sheet according to claim 4, wherein the adhesive layer is formed by disposing an adhesive in dots on the nanofiber layer or depositing an adhesive in the form of nanofiber on the nanofiber layer.

7. The nanofiber sheet according to claim 4, wherein the nanofiber layer is thicker than the adhesive layer.

8. The nanofiber sheet according to claim 4, wherein the base layer has a Taber stiffness of 0.01 to 0.4 mNm.

9. The nanofiber sheet according to claim 4, wherein the base layer comprises an air-permeable sheet.

* * * * *